(12) United States Patent
Maiorana et al.

(10) Patent No.: US 10,904,381 B1
(45) Date of Patent: *Jan. 26, 2021

(54) FRAUD DETECTION IN CONTACT CENTERS USING DEEP LEARNING MODEL (71) Applicant: Wells Fargo Bank, N.A., San Francisco, CA (US)

(72) Inventors: Nick A. Maiorana, Charlotte, NC (US); Judy Cantor, Tinton Falls, NJ (US); Kevin R. Cieslak, Novato, CA (US); David Gorlesky, Concord, NC (US); Jeremy Ernst, Waxhaw, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/901,878

(22) Filed: Jun. 15, 2020

Related U.S. Application Data (63) Continuation of application No. 16/138,265, filed on Sep. 21, 2018, now Pat. No. 10,721,350.
(Continued)

(51) Int. Cl.
*H04M 3/22* (2006.01)
*G06N 3/08* (2006.01)
(Continued)

(52) U.S. Cl.
CPC ...... *H04M 3/2281* (2013.01); *G06K 9/00536* (2013.01); *G06N 3/08* (2013.01);
(Continued)

(58) Field of Classification Search
CPC ............. H04M 3/2281; H04M 3/5166; H04M 3/5183; H04M 3/42221; G06K 9/00536;
(Continued)

(56) References Cited

U.S. PATENT DOCUMENTS 5,590,317 A * 12/1996 Iguchi ..................... G06F 16/93
2003/0182214 A1* 9/2003 Taylor .................... G06Q 40/00
705/35
(Continued)

OTHER PUBLICATIONS

Prosecution History from U.S. Appl. No. 16/138,265, dated Nov. 27, 2019 through Mar. 19, 2020, 35 pp.
(Continued)

*Primary Examiner* — Md S Elahee
(74) *Attorney, Agent, or Firm* — Shumaker & Sieffert, P.A.

(57) ABSTRACT

An example method is described. The method includes receiving, by a computing system, data indicative of a call into an interactive voice response (IVR) system from a user device and determining, by the computing system and based on the data, a set of actions performed by the user device within the IVR system and a corresponding set of results performed by the IVR system during the call. Additionally, the method includes converting, by the computing system, the set of actions and the corresponding set of results into a sequence of code pairs using a dictionary established based on training data, determining, by the computing system, an activity pattern during the call based on the sequence of code pairs; and calculating, by the computing system, a probability that the call is fraudulent based on the activity pattern during the call.

20 Claims, 5 Drawing Sheets

Related U.S. Application Data (60) Provisional application No. 62/720,761, filed on Aug. 21, 2018.

(51) Int. Cl.
*G10L 15/22* (2006.01)
*H04M 3/51* (2006.01)
*G06K 9/00* (2006.01)
*G06N 3/04* (2006.01)

(52) U.S. Cl.
CPC ............ *G10L 15/22* (2013.01); *H04M 3/5166* (2013.01); *G06N 3/04* (2013.01); *G10L 2015/223* (2013.01); *H04M 2201/40* (2013.01)

(58) Field of Classification Search
CPC ........... G06N 3/08; G10L 15/22; G10L 17/04; G10L 17/06
USPC ................. 379/45, 88.01–88.04, 114.14, 379/265.01–266.1; 705/35
See application file for complete search history.

(56) References Cited

U.S. PATENT DOCUMENTS

| | | | | |
|---|---|---|---|---|
| 2006/0285665 | A1* | 12/2006 | Wasserblat | G06Q 20/4016 379/114.14 |
| 2010/0260325 | A1* | 10/2010 | Clawson | G16H 40/20 379/45 |

OTHER PUBLICATIONS

U.S. Appl. No. 16/138,265, (Naming Inventors: Maiorana et al.), filed Sep. 21, 2018.

\* cited by examiner

FRAUD DETECTION IN CONTACT CENTERS USING DEEP LEARNING MODEL

This application is a continuation of U.S. patent application Ser. No. 16/138,265, filed on Sep. 21, 2018, which claims the benefit of U.S. Provisional Patent Application No. 62/720,761, filed on Aug. 21, 2018. The entire content of each of these applications is incorporated herein by reference.

TECHNICAL FIELD

The disclosure relates to computing systems, and more specifically, computing systems executing deep learning models configured to detect patterns.

BACKGROUND

A contact center is a facility configured to handle incoming voice calls from customers or potential customers of a business or organization. One function of the contact center is to handle customer service inquiries focused on customer accounts with the business, e.g., servicing existing accounts and opening new accounts. Although many customer service inquiries can be handled through online interactions (e.g., via websites, email, or mobile applications), for some businesses, a contact center may be regarded as necessary. Customers of banks, for example, may prefer to speak to a live person when resolving service issues. A contact center may include one or more interactive voice response (IVR) systems and one or more agent desktop systems used by a number of human agents that are representatives of the business.

SUMMARY

In general, this disclosure describes techniques for performing fraud detection using a deep learning model within a contact center of a business or organization. More specifically, this disclosure describes a fraud detection computing system configured to analyze data indicative of an incoming call into an interactive voice response (IVR) system and calculate a probability that the call is fraudulent. The computing system uses a deep learning model to normalize the data indicative of the incoming call and determine an activity pattern during the call. The computing system then calculates a probability that the call is fraudulent based on the activity pattern during the call. In some examples, the fraud detection computing system may be configured to detect whether incoming calls are fraudulent in real-time. In addition, the fraud detection computing system may alert or otherwise notify a fraud management system of the contact center if an incoming call is determined to be fraudulent, thus prompting the fraud management system to apply one or more interdiction schemes to the call in order to prevent or mitigate fraudulent access to the contact center.

The deep learning model may include a recurrent neural network (RNN). The deep learning model may be trained using training data corresponding to a plurality of calls into IVR systems. During training, the deep learning model may generate a dictionary used to normalize data associated with the plurality of calls, and identify patterns associated with known fraudulent calls in the plurality of calls included in the training data. The deep learning model may be periodically retrained using an updated set of training data.

In one example, a method includes receiving, by a computing system, data indicative of a call into an interactive voice response (IVR) system from a user device and determining, by the computing system and based on the data, a set of actions performed by the user device within the IVR system and a corresponding set of results performed by the IVR system during the call. The method further includes converting, by the computing system, the set of actions and the corresponding set of results into a sequence of code pairs using a dictionary generated based on a set of training data, determining, by the computing system, an activity pattern during the call based on the sequence of code pairs, and calculating, by the computing system, a probability that the call is fraudulent based on the activity pattern during the call.

In another example, a computing system includes a memory and one or more processors in communication with the memory and configured to receive data indicative of a call into an interactive voice response (IVR) system from a user device, determine a set of actions performed by the user device and a corresponding set of results performed by the IVR system during the call, and convert the set of actions and the corresponding set of results into a sequence of code pairs using a dictionary generated based on a set of training data. The one or more processors are further configured to determine an activity pattern during the call based on the sequence of code pairs and calculate a probability that the call is fraudulent based on the activity pattern during the call.

In another example, a computer readable medium includes instructions that when executed cause one or more processors to receive data indicative of a call into an interactive voice response (IVR) system from a user device, determine, based on the data, a set of actions performed by the user device and a corresponding set of results performed by the IVR system during the call, and convert the set of actions and the corresponding set of results into a sequence of code pairs using a dictionary generated based on a set of training data. The instructions further cause the one or more processors to determine an activity pattern during the call based on the sequence of code pairs and calculate a probability that the call is fraudulent based on the activity pattern during the call.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
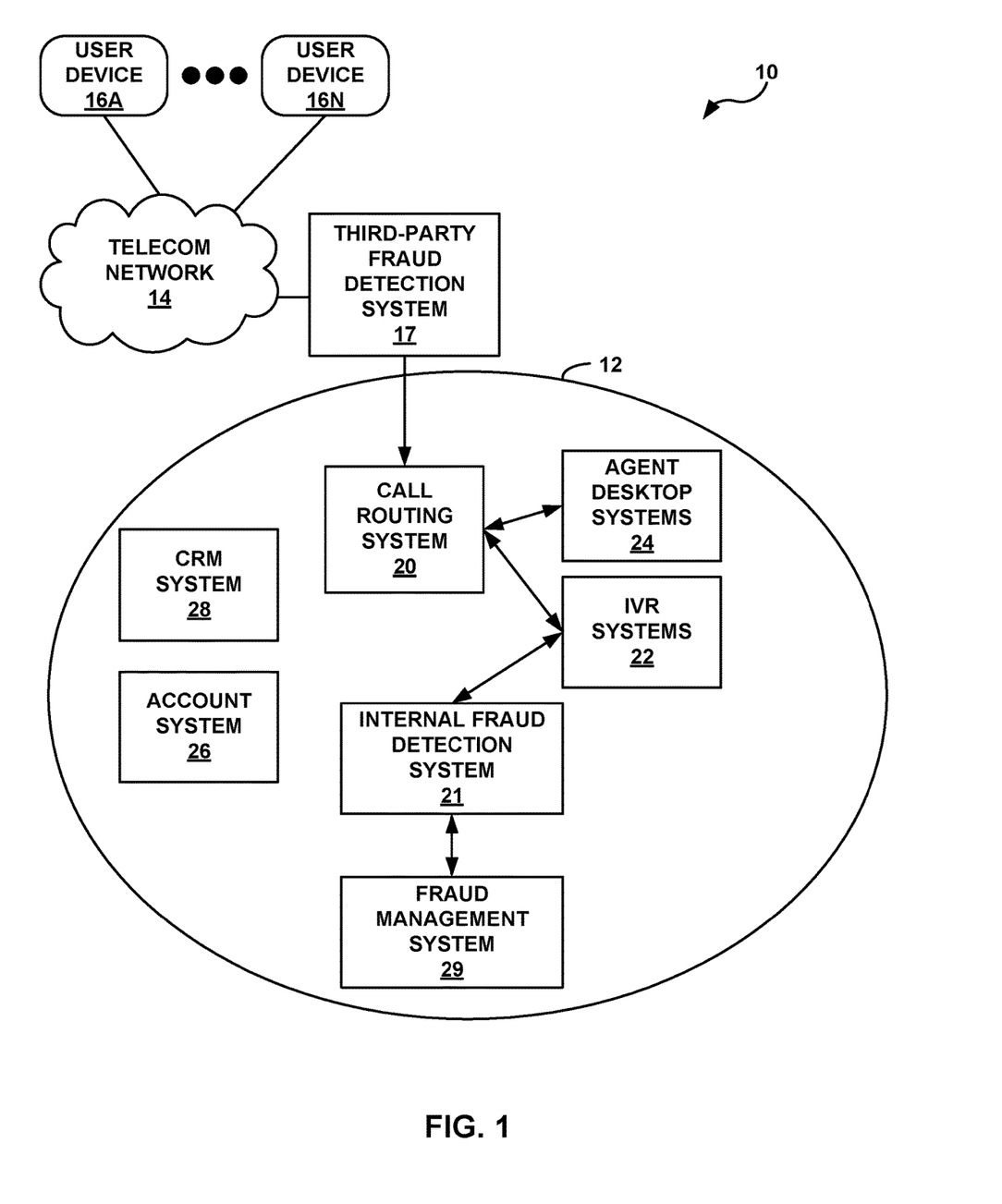
FIG. 1 is a block diagram illustrating an example contact center that includes an internal fraud detection system configured to predict whether an incoming call into the contact center is fraudulent, in accordance with the techniques of this disclosure.

FIG. 1 is a block diagram illustrating example contact center 12 within a network 10 that includes internal fraud detection system 21 configured to predict whether an incoming call into contact center 12 is fraudulent, in accordance with the techniques of this disclosure. As illustrated in FIG. 1, network 10 includes one or more user devices 16A-16N (collectively "user devices 16") in communication with contact center 12 via a telecommunications network 14.

Contact center 12 is a facility configured to handle incoming voice calls from user devices 16 operated by users that may be customers or potential customers of a business or organization. In some cases, contact center 12 may be referred to as a call center. Contact center 12 includes several disparate computing systems configured to handle customer service inquiries focused on customer accounts with the business, i.e., servicing existing accounts and opening new accounts. In some examples described in this disclosure, contact center 12 may be a contact center of a bank or other financial institution. Contact center 12 may be especially useful for those customers that prefer to speak to a live person when resolving service issues or that feel more comfortable sharing personal information over a voice channel than an online channel (e.g., website, email, or mobile application). Contact center 12 may also provide certain services that may not be available via online channels, such as opening new accounts with the business or organization.

User devices 16 may be any suitable communication or computing device, such as a conventional or landline phone, or a mobile, non-mobile, wearable, and/or non-wearable computing device capable of communicating over telecom network 14. One or more of user devices 16 may support communication services over packet-switched networks, e.g., the public Internet, including Voice over Internet Protocol (VOIP). One or more of user devices 16 may also support communication services over circuit-switched networks, e.g., the public switched telephone network (PSTN).

Each of user devices 16 is operated by a user (i.e., the caller) that may be a customer or a potential customer of the business or organization that provides contact center 12. In the case of a business or corporate customer, the user may be a representative of the business or corporate customer. In some examples, the user may be a non-human robo-caller utilized by a fraudster or bad actor. In other examples, the user may be a human fraudster or bad actor. In general, each of user devices 16 may represent a landline phone, a conventional mobile phone, a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure.

In cases where the user is a fraudster, the user may attempt to deceive contact center 12 into revealing information relating to one or more accounts associated with one or more customers of the business or organization that provides contact center 12. A fraudulent user may use at least one of user devices 16 to call contact center 12, and the user may attempt to pass as a legitimate customer. In some examples, the user may attempt to convince contact center 12 into changing an account password or opening a new account. In other examples, the user may endeavor to obtain account numbers, account balances, PIN numbers, or the like from contact center 12. It may be beneficial to identify the call as fraudulent in real-time as the user is interacting with contact center 12 in order to apply a variety of interdiction schemes to the call in an attempt to gather more information about the fraudulent caller while limiting the exposure of customer accounts to the fraudulent caller.

Telecom network 14 may be a computer network (e.g., a wide area network (WAN), such as the Internet, a local area network (LAN), or a virtual private network (VPN)), a telephone network (e.g., the PSTN or a wireless network), or another wired or wireless communication network. Although illustrated as a single entity, telecom network 14 may include a combination of multiple networks.

Contact center 12 may include a centralized or distributed network of the disparate computing systems made up of interconnected desktop computers, laptops, workstations, wireless devices, network-ready appliances, file servers, print servers, or other computing devices. For example, contact center 12 may include one or more data centers including a plurality of servers configured to provide account services interconnected with a plurality of databases and other storage facilities in which customer credentials, customer profiles, and customer accounts are stored.

In the example of FIG. 1, contact center 12 includes systems in which a customer may interact, including one or more interactive voice response (IVR) systems 22, one or more agent desktop systems 24 used by a number of human agents that are representatives of the business or organization, and a customer relationship management (CRM) system 28. These systems may be third-party vendor products used by the business or organization to interact with its customers. Contact center 12 also includes call routing system 20 and internal fraud detection system 21. In this example, call routing system 20 and internal fraud detection system 21 may be propriety tools of the business or organization to facilitate the functions of contact center 12, including collecting, storing, and maintaining data used by contact center 12. In addition, contact center 12 interacts with third-party fraud detection system 17, which may be included in contact center 12 itself or may be administered by a third-party network (not shown). The architecture of contact center 12 illustrated in FIG. 1 is shown for exemplary purposes only and should not be limited to this architecture. In other examples, contact center 12 may include more, fewer, or different computing systems configured to handle customer service inquiries.

In the example of FIG. 1, one of user devices 16, e.g., user device 16A, may initiate a call to contact center 12 of a bank in response to input from an operator of user device 16A. User device 16A outputs a signal over telecom network 14. Third-party fraud detection system 17 may operate as a gateway to contact center 12 by providing an initial determination of whether an inbound call is fraudulent. For example, third-party fraud detection system 17 may compare markers, e.g., phoneprints or voiceprints, for the inbound call to known fraudsters, and provide risk information to contact center 12. In some examples, third-party fraud detection system 17 may be implemented using fraud detection solutions for call centers available through Pindrop®. Third-party fraud detection system 17 may provide a risk score or other indication of potentially fraudulent intent for each inbound call to contact center 12. In the case where the inbound call is identified as fraudulent by third-party fraud detection system 17, the inbound call may be dropped prior to entering contact center 12.

In other cases, where the inbound call is not identified as fraudulent by third-party fraud detection system 17, call routing system 20 of contact center 12 receives the inbound call from telecom network 14 and determines whether to route the inbound call to one of IVR systems 22 or one of agent desktop systems 24. In accordance with the techniques of this disclosure, internal fraud detection system 21 monitors the inbound call when routed to IVR systems 22. Call routing system 20 may route calls to one of a number of destinations, including to IVR systems 22, agent desktop systems 24, or to other devices, users, or systems. In some examples, call routing system 20 may be implemented using call routing solutions available through Genesys Telecommunications Laboratories. In an example where user device 16A requests to speak with a human agent or selects a service that can only be performed by a human agent, call routing system 20 routes the call to one of agent desktop systems 24, thereby enabling a user of user device 16A and a human agent at the one of agent desktop systems 24 to engage in a voice communication session. In an example where user device 16A selects a service for which an IVR program is available, call routing system 20 routes the call to the appropriate one of IVR systems 22, thereby enabling the user of user device 16A to interact with the IVR program.

Authentication of the user operating user device 16A may be performed by an authentication IVR program provided by one of IVR systems 22, or any of the human agents at agent desktop systems 24. As one example, the one of IVR systems 22 may issue authentication challenges to the operator of user device 16A during the call, store the responses received from the operator via user device 16A, and, based on the responses, make a determination about whether the operator of user device 16A is authenticated or issue additional authentication challenges. As an alternative example, a human agent at one of agent desktop systems 24 may issue authentication challenges to the operator of user device 16A during the voice communication session and, upon hearing the response of the operator of user device 16A, the human agent may make a determination about whether the operator of user device 16A is authenticated or issue additional authentication challenges. In any of the previous examples, the authentication determination may be based on customer credentials accessible from account system 26 and/or CRM system 28.

Once the operator of user device 16A is authenticated as a customer of the business or organization, one or more of IVR systems 22 and/or the human agents at agent desktop systems 24 may process account service requests received from the customer via user device 16A. In accordance with the techniques of this disclosure, internal fraud detection system 21 monitors the call between user device 16A and one of IVR systems 22 while the call is occurring and account service requests are being processed. In the example of a bank or other financial institution, account service requests may include account balance inquiries, most recent transaction inquiries, money transfers, opening or closing accounts, updating or resetting security credentials, changing or rebalancing investment funds, or the like. IVR systems 22 and the human agents at agent desktop systems 24 may process the account service requests by accessing customer accounts via account system 26 and customer profiles via CRM system 28.

IVR systems 22 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, IVR systems 22 represent cloud computing systems, server farms, and/or server clusters (or portions thereof) that provide services to client devices and other devices or systems. In other examples, IVR systems 22 may represent or be implemented through one or more virtualized compute instances (e.g., virtual machines, containers) of a data center, cloud computing system, server farm, and/or server cluster. IVR systems 22 may communicate with external systems via one or more networks (e.g., contact center 12). In some examples, IVR systems 22 may use network interfaces (such as Ethernet interfaces, optical transceivers, radio frequency (RF) transceivers, Wi-Fi or Bluetooth radios, or the like), telephony interfaces, or any other type of device that can send and receive information to wirelessly communicate with external systems, e.g., call routing system 20 or internal fraud detection system 21 of contact center 12.

IVR systems 22 may host IVR programs used to perform customer service functions for calls into contact center 12, such as authentication, retrieving customer account information, retrieving the last several transactions performed using a specific account, initiating a fund transfer, changing account settings, resetting a PIN or other security credentials, or the like. IVR systems 22 may manage the order in which input prompts are presented to a caller of an inbound call to facilitate the customer service functions provided by the IVR programs. The order in which input prompts are presented to the caller may be based on an IVR input prompt tree and a caller's response to one or more input prompts. The one or more or more input prompts may include one or more requests for information and/or one or more telephony menus, with each telephony menu having one or more different input options (e.g., press "1" for English or press "2" for Spanish would be a telephony menu having two input options). Each telephony menu may include one or more telephony sub-menus. IVR systems 22 may be configured to receive input information from one or more of user devices 16 and process the input information. Processing input information received from one or more of user devices 16 may result in one or more results. For example, IVR systems 22 may provide one or more subsequent input prompts, may initiate a call transfer, or perform any other action based on the input information. Internal fraud detection system 21 is configured to detect whether the actions and results during an incoming call with one of IVR systems 22 indicate fraudulent behavior, as discussed in further detail below.

Internal fraud detection system 21 is configured to analyze data indicative of calls into one or more of IVR systems 22 and calculate a probability that each of the calls is fraudulent. As described in more detail with respect to FIG. 2, internal fraud detection system 21 uses a deep learning model to normalize the data indicative of incoming calls and determine activity patterns during the calls. Internal fraud detection system 21 then calculates a probability that each of the calls is fraudulent based on the activity pattern during the respective call. In the example illustrated in FIG. 1, internal fraud detection system 21 may receive data indicative of a call into IVR systems 22 from at least one of user devices 16, e.g., user device 16A. The data received by internal fraud detection system 21 may include data indicative of a set of actions performed by user device 16A within one of IVR systems 22 during the call and a corresponding set of results performed by the one of IVR systems 22 during the call. In some examples, the data resembles a sequence of events, each event of the sequence of events representing an action performed by user device 16A or a result provided by the one of IVR systems 22. For example, the action may include a request for an account balance performed by user device 16A and the result may include a numerical value indicative of the account balance provided by the one of IVR systems 22. Internal fraud detection system 21 may be configured to receive data from IVR systems 22 in real-time (e.g., internal fraud detection system 21 may receive data indicative of an inbound call as the call is occurring).

As the data indicative of the call into IVR systems 22 is received by internal fraud detection system 21, internal fraud detection system 21 determines the set of actions received by the one of IVR systems 22 from user device 16A and the corresponding set of results delivered by the one of IVR systems 22. Internal fraud detection system 21 then converts the set of actions and the corresponding set of results into a sequence of code pairs using a dictionary (e.g., a word-to-index mapping of actions and results) generated by internal fraud detection system 21 for the deep learning model. Internal fraud detection system 21 may be configured to convert the sets of actions and the corresponding sets of results into the sequence of code pairs for use as input to the deep learning model, which is trained to determine a potentially fraudulent activity pattern during the call based on the sequence of code pairs.

Internal fraud detection system 21 may be configured to train the deep learning model based on a set of training data that includes a plurality of calls into one or more IVR systems 22, in which each call of the plurality of calls is either verifiably fraudulent or verifiably non-fraudulent. As part of the training, internal fraud detection system 21 may generate the dictionary used to create sequences of code pairs to be used as input to the deep learning model. The deep learning model may include an artificial neural network, such as a recurrent neural network (RNN). During training of the model, an RNN may identify a plurality of patterns in a plurality of sequences of events. In other words, the RNN may observe locations of events in sequences known to be fraudulent. After the model is trained, the model may accept a sequence of events as an input and produce a determination (e.g., fraudulent or non-fraudulent) as an output, a process known as sequence classification.

Based on a sequence of code pairs identified in an incoming call to one of IVR systems 22, internal fraud detection system 21 may be configured to determine an activity pattern during the call. For example, internal fraud detection system 21 may compare the sequence of code pairs to one or more known patterns associated with fraudulent calls to determine the activity pattern during the call. Internal fraud detection system 21 then calculates a probability that the incoming call is fraudulent based on the established activity pattern. For example, internal fraud detection system 21 may calculate the probability by determining a level of similarity between the sequence of code pairs and the known patterns associated with fraudulent calls.

In one example, in response to determining that the probability that an incoming call is fraudulent is above a threshold value, internal fraud detection system 21 may alert fraud management system 29 that the incoming call is likely fraudulent. For example, internal fraud detection system 21 may alert fraud management system 29 while a fraudulent call from user device 16A into one of IVR systems 22 is occurring, and fraud management system 29 may apply one or more interdiction schemes to the call in order to prevent or mitigate fraudulent access to customer accounts by user device 16A via contact center 12. The interdiction schemes may be performed by the one of IVR systems 22 that is handling the call. For example, the one of IVR systems 22 may be instructed to prompt user device 16A for user-specific information, such as an answer to a security question, a PIN number, an account number, digits of a social security number, or the like. Additionally, or alternatively, fraud management system 29 may disable access to one or more customer accounts that user device 16A is attempting to access and may prevent the one of IVR systems 22 from providing any additional information requested by the user.

Figure 2:
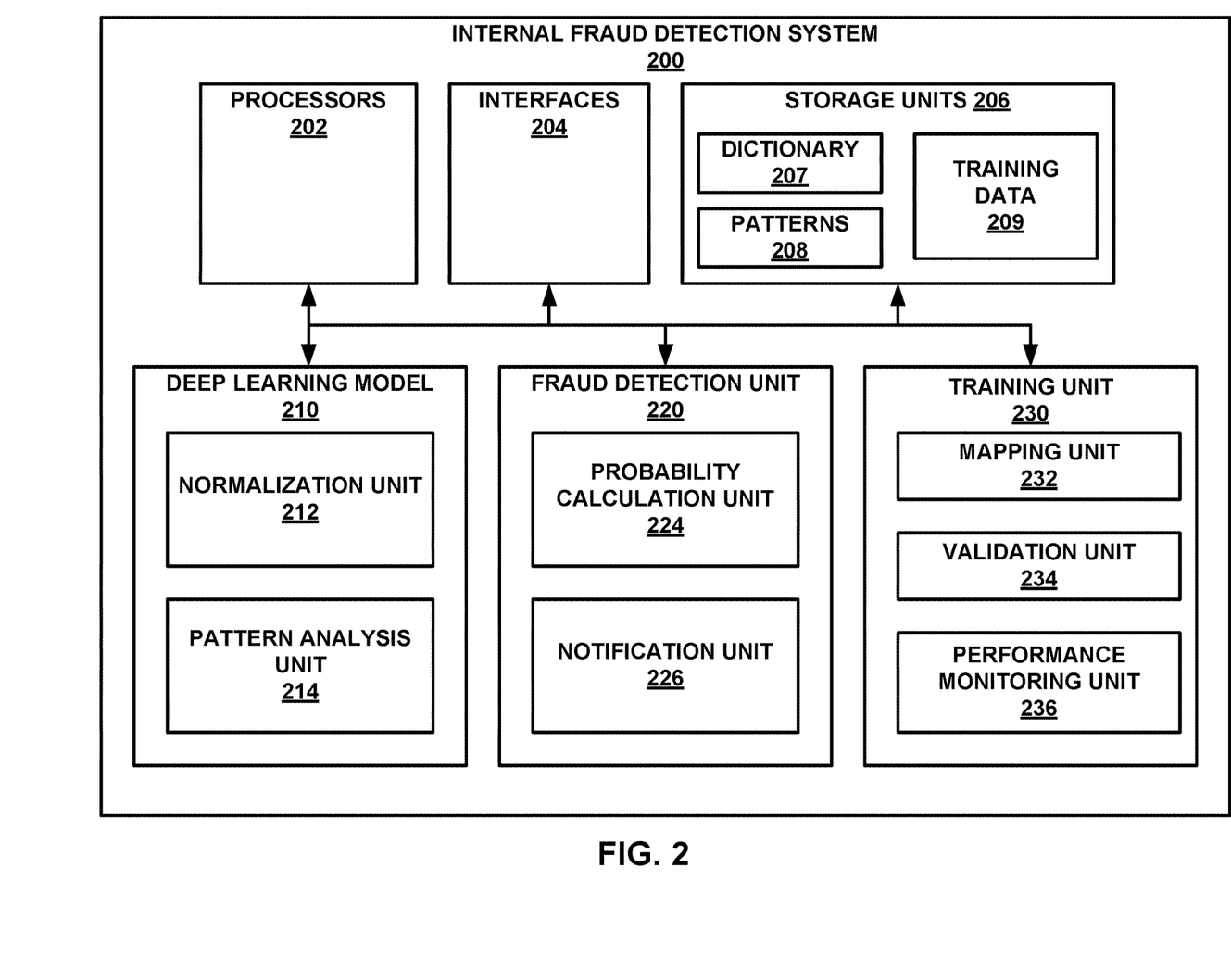
FIG. 2 is a block diagram illustrating an example internal fraud detection system, in accordance with the techniques of this disclosure.

FIG. 2 is a block diagram illustrating an example internal fraud detection system 200, in accordance with the techniques of this disclosure. Internal fraud detection system 200 of FIG. 2 may be described as an example or alternative implementation of internal fraud detection system 21 within contact center 12 of FIG. 1. One or more aspects of internal fraud detection system 200 of FIG. 2 may be described within the context of contact center 12 of FIG. 1. The architecture of internal fraud detection system 200 illustrated in FIG. 2 is shown for exemplary purposes only. Internal fraud detection system 200 should not be limited to the illustrated example architecture. In other examples, internal fraud detection system 200 may be configured in a variety of ways.

In the example illustrated in FIG. 2, internal fraud detection system 200 includes deep learning model 210 configured to normalize data indicative of incoming calls to an IVR system of a call center, e.g., contact center 12, and determine activity patterns during the calls. Internal fraud detection system 200 further includes a fraud detection unit 220 configured to request analysis of the incoming calls by deep learning model 210 and calculate a probability that each of the calls is fraudulent based on the activity pattern output from deep learning model 210. Internal fraud detection system 200 also includes a training unit 230 configured to train deep learning model 210, including generating a dictionary for use by deep learning model 210, based on a set of training data that includes a plurality of calls into one or more IVR systems.

Internal fraud detection system 200 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, internal fraud detection system 200 represents a cloud computing system, server farm, and/or server cluster (or portion thereof) that provides services to client devices and other devices or systems. In other examples, internal fraud detection system 200 may represent or be implemented through one or more virtualized compute instances (e.g., virtual machines, containers) of a data center, cloud computing system, server farm, and/or server cluster.

As shown in the example of FIG. 2, internal fraud detection system 200 includes one or more processors 202, one or more interfaces 204, and one or more storage units 206. Internal fraud detection system 200 also includes a deep learning model 210, a fraud detection unit 220, and a training unit 230, which may be implemented as program instructions and/or data stored in storage units 206 and executable by processors 202. Storage units 206 of internal fraud detection system 200 may also store an operating system (not shown) executable by processors 202 to control the operation of components of internal fraud detection system 200. The components, units or modules of internal fraud detection system 200 are coupled (physically, communicatively, and/or operatively) using communication channels for inter-component communications. In some examples, the communication channels may include a system bus, a network connection, an inter-process communication data structure, or any other method for communicating data.

Processors 202, in one example, may comprise one or more processors that are configured to implement functionality and/or process instructions for execution within call screening system 30. For example, processors 202 may be capable of processing instructions stored by storage units 206. Processors 202 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Internal fraud detection system 200 may utilize interfaces 204 to communicate with external systems via one or more networks, e.g., contact center 12 of FIG. 1. Interfaces 204 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, internal fraud detection system 200 utilizes interfaces 204 to wirelessly communicate with external systems, e.g., IVR systems 22, and fraud management system 29 of contact center 12 from FIG. 1.

Storage units 206 may be configured to store information within internal fraud detection system 200 during operation. Storage units 206 may include a computer-readable storage medium or computer-readable storage device. In some examples, storage units 206 include one or more of a short-term memory or a long-term memory. Storage units 206 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 206 are used to store program instructions for execution by processors 202. Storage units 206 may be used by software or applications running on internal fraud detection system 200 to temporarily store information during program execution.

Fraud detection unit 220 may include probability calculation unit 224 and notification unit 226. Training unit 230 may include mapping unit 232, validation unit 234, and performance monitoring unit 236. Deep learning model 210 may include normalization unit 212 and pattern analysis unit 214.

Deep learning model 210 may include a function (e.g., a machine learning algorithm) configured to be executed by processors 202. In some examples, deep learning model 210 implements supervised learning, e.g., classifies sets of data into groups. For example, a set of data, such as a sequence of code pairs representing a call into contact center 12, may be classified as either fraudulent or non-fraudulent. The function may include nodes, layers, and connections, and the function may be represented by equations having a plurality of variables and a plurality of known coefficients.

Machine learning algorithms, such as the function of deep learning model 210, may be trained using a training process to create data-specific models, such as deep learning model 210 based on training data 209. After the training process, the created model may be capable of determining an output data set based on an input data set (e.g., match a sequence of code pairs representing an incoming call to one or more known patterns associated with fraudulent calls). The training process may implement a set of training data (e.g., training data 209) to create the model.

Training data 209 may include data indicative of a plurality of calls between user devices 16 and contact center 12. In the example illustrated in FIG. 2, training data 209 is stored in storage units 206. The plurality of calls may include a group of fraudulent calls and a group of non-fraudulent calls, and each call of the plurality of calls is either known to be fraudulent or known to be non-fraudulent. In one example, training data 209 contains data representing about equal numbers of fraudulent calls and non-fraudulent calls. Training unit 230 may access training data 209 stored in storage units 206, and training unit 230 may train deep learning model 210 using training data 209. Mapping unit 232 of training unit 230 may create dictionary 207 by identifying a plurality of words in the plurality of calls representing training data 209. In other words, dictionary 207 may include a list of words (e.g., actions and results) commonly occurring in the plurality of calls of training data 209. In one example, dictionary 207 includes greater than about 30,000 words and less than about 40,000 words. In other examples, dictionary 207 may include less than about 30,000 words or greater than about 40,000 words.

During the training, deep learning model 210 may identify a group of patterns, e.g., patterns 208, associated with fraudulent behavior. In other words, deep learning model 210 may identify the group of patterns associated with the fraudulent calls of the plurality of calls in training data 209. Based on training data 209, a machine learning algorithm or function (e.g., an RNN) is trained to create deep learning model 210 configured to accept an input sequence of code pairs representing an incoming call and produce an output classification of whether the incoming call is fraudulent or non-fraudulent. The function may include weight values, scalar coefficients, and bias values. Training unit 230 may output dictionary 207 and patterns 208 to storage units 206.

Validation unit 234 may be configured to determine an accuracy of deep learning model 210. For example, validation unit 234 may use deep learning model 210 to determine if an example sequence of code pairs representing an incoming call is fraudulent or non-fraudulent. A classification (e.g., fraudulent or non-fraudulent) of the example sequence of code pairs may be known. Validation unit 234 may determine if deep learning model 210 was able to correctly classify the incoming call. Additionally, validation unit 234 may be configured to determine the accuracy of deep learning model 210 for a plurality of example sequences of code pairs, and validation unit 234 may be configured to identify an accuracy (e.g., a success rate) in which deep learning model 210 correctly classifies sequences of code pairs. If the accuracy is above a threshold accuracy value, fraud detection unit 220 may use deep learning model 210 to classify incoming calls to contact center 12. If the accuracy is below the threshold accuracy value, training unit 230 may re-train deep learning model 210 based on an updated set of training data. In some examples, the accuracy rate of deep learning model 210 may be greater than about 87%. In other examples, the accuracy rate of deep learning model 210 may be greater than about 95%.

Training unit 230 may include performance monitoring unit 236. Performance monitoring unit 236 may monitor a performance of deep learning model 210 after it is applied to analyze incoming calls to contact center 12. In some examples, performance monitoring unit 236 may determine an accuracy of deep learning model 210 by comparing fraudulence determinations with known fraudulence identities. For example, if deep learning model 210 determines that an incoming call is fraudulent, and the incoming call is discovered to be non-fraudulent, performance monitoring unit 236 may record that an incorrect fraudulence determination was made. Performance monitoring unit 236 may continuously monitor an accuracy of deep learning model 210. Performance monitoring unit 236 may determine a fraction of calls in which deep learning model 210 correctly classifies an incoming call. The fraction may represent a measured accuracy of the model. New calls may be analyzed by performance monitoring unit 236, the new calls representing data that was not used by training unit 230 to create the model. In other words, performance monitoring unit 236 may test the accuracy of the model continuously using new data. In some examples, if performance monitoring unit 236 determines that the accuracy of deep learning model 210 is below a threshold accuracy value, performance monitoring unit 236 may output an instruction to re-train deep learning model 210.

Training unit 230 may periodically (e.g., monthly, bi-monthly, yearly, or the like) re-train deep learning model 210 based on an updated set of training data. The updated set of training data may include part or all of the plurality of calls of training data 209. Additionally, the updated set of training data may include a set of calls that occurred during a time since deep learning model 210 was last trained by training unit 230.

In the illustrated example of FIG. 2, deep learning model 210 includes normalization unit 212 and pattern analysis unit 214. Normalization unit 212 is configured to normalize data indicative of incoming calls to an IVR system of a call center, e.g., contact center 12. For example, normalization unit 212 may identify a plurality of primary species of words received by internal fraud detection system 200. The plurality of primary species of words may occur during an incoming call into contact center 12. In some examples, the plurality of primary species of words may be received from a user device, such as a user device 16 of FIG. 1. The user device 16 may include any of user devices 16A-16N, or any combination thereof. In general, the term "words" may include words of the English language or other languages, single numerals, groups of single numerals, numerical strings, groups of numerical strings, single characters, groups of single characters, character strings, groups of character strings, or the like. Each primary species of the plurality of primary species of words identified by normalization unit 212 may represent an action from a set of actions entered into the user device 16 during the incoming call. Normalization unit 212 may assign an action code to represent each action of the set of actions. Dictionary 207, stored in storage units 206, may be configured to map action codes to the set of actions entered into user device 16 during an incoming call. Dictionary 207 may represent a plurality of words commonly occurring during incoming calls to contact center 12.

Normalization unit 212 may be additionally configured to identify a plurality of secondary species of words produced (e.g., entered) by IVR systems 22. Each secondary species of the plurality of secondary species of words may represent a result from a set of results performed by IVR systems 22 during an incoming call between one of user devices 16 and contact center 12. For example, IVR systems 22 may respond to an action performed by a user device 16, and normalization unit 212 may be configured to identify a secondary species of words representing corresponding results to each action performed by user devices 16. Dictionary 207 may map a result code to each identified secondary species of words representing the set of results.

Normalization unit 212 may convert a set of actions and a corresponding set of results into a sequence of code pairs. In some examples, converting the set of actions and the corresponding set of results includes normalizing unique values included in the set of results performed by the one of IVR systems 22 during the call. Normalizing the unique values may include assigning one of a set of generalized result codes to each of the unique values.

Each "species" of words, including primary species of words and secondary species of words, may be a group of words related to a single action or result in an incoming call to contact center 12 (e.g., an incoming call between a user device 16 and IVR systems 22). In some examples, normalization unit 212 may identify a species of words including a group of words, such as a string of numerals representing an account number unique to an account being accessed by the user device 16 engaged in the incoming call with contact center 12. An account number may be mapped to a single event code (e.g., action code or result code). In other words, any account number may be mapped to the same event code. Normalization unit 212 may assign an event code to represent the species of words corresponding to the account number. The event code may be mapped to the account number by dictionary 207. In some examples, the event code is not unique to the account being accessed by user device 16, rather the event code is mapped to any account number occurring within an incoming call to contact center 12. In other examples, normalization unit 212 identifies a species of words in an incoming call, the species of words representative of an exact amount of currency. The exact amount of currency may be unique to an action or a result performed during an incoming call. Dictionary 207 may map a single event code to the string of words identified in the call by normalization unit 212, however the single event code may not be unique to the exact amount of currency or to the incoming call. In some examples, a single event code may be assigned to any amount of currency.

Normalization unit 212 may match action codes and result codes, creating code pairs including an action code and a corresponding result code. Additionally, normalization unit 212 may generate a sequence of code pairs including each code pair in the incoming call to contact center 12. The sequence of code pairs created by normalization unit 212 of deep learning model 210 may display actions, results, and code pairs in a chronological order in which they occur during an incoming call to contact center 12. Normalization unit 212 may be configured to update the sequence of code pairs as the incoming call is commencing, adding new code pairs to the sequence as they arrive at deep learning model 210. In some examples, an action does not occur consecutively with its corresponding result. In one example sequence, a first action may occur, and a second action may occur immediately following the first action. Subsequently, a first result corresponding to the first action may occur, followed by a second result corresponding to the second action. In this example sequence, the first action and the first result are separated by the second action. Furthermore, the second action and the second result are separated by the first result. In other example sequences, an action and a corresponding result may be separated by any number of events.

After normalization unit 212 converts the data representing an incoming call into a sequence of code pairs, pattern analysis unit 214 of deep learning model 210 may be configured to identify patterns in the sequence of code pairs. In some examples, pattern analysis unit 214 may be configured to identify a pattern in an incoming call as one of patterns 208 determined during the training of deep learning model 210 as being patterns associated with fraudulent calls.

Additionally, fraud detection unit 220 may be configured to determine a probability that an incoming call to contact center 12 is fraudulent. Probability calculation unit 224 may calculate a probability that an incoming call is a fraudulent call based on the pattern identified in the incoming call by pattern analysis unit 214. Probability calculation unit 224 may calculate the probability based on a level of similarity between the identified pattern in the incoming and patterns 208 associated with fraudulent calls. In some examples, the probability that the incoming call is given by a value ranging from 0 to 1, a value of 0 representing a 0% chance that the incoming call is fraudulent, and a value of 1 representing a 100% chance that the incoming call is fraudulent.

Fraud detection unit 220 may output notifications of a determined probability via notification unit 226. In some examples, fraud detection unit 220 may use network interfaces (such as Ethernet interfaces, optical transceivers, RF transceivers, Wi-Fi or Bluetooth radios, or the like), telephony interfaces, or any other type of device that can send and receive information to wirelessly communicate with external systems, e.g., IVR systems 22 or fraud management system 29 of contact center 12. In some examples, in response to determining that the probability an incoming call is fraudulent is below a threshold value, notification unit 226 may output a determination to a fraud management system (e.g., fraud management system 29 of FIG. 1) that the incoming call is non-fraudulent. Alternatively, if fraud detection unit 220 determines that the probability an incoming call is above a threshold value, notification unit 226 may output a determination to the fraud management system that that the incoming call is fraudulent. In one example, the threshold value is 0.95 (indicating a 95% chance that the call is fraudulent). In other examples, the threshold value may be greater or less than 0.95.

In some examples, notification unit 226 may output a determination that the incoming call is fraudulent to fraud management system 29. In response to receiving the determination that the incoming call is fraudulent, fraud management system 29 may perform a plurality of actions relating to at least one account associated with the user device 16 engaged in the incoming call with contact center 12 (e.g., IVR systems 22). For example, fraud management system 29 may, among other things, apply one or more interdiction schemes to the call. The interdiction schemes may include locking at least one customer account and prompting user device 16 for information (e.g., answers to security questions, social security number, or the like). The interdiction schemes may be performed by the one of IVR systems 22 that is handling the call.

Fraud detection unit 220 may calculate a probability that an incoming call is fraudulent in real time, and in some examples, identify that an incoming call is likely fraudulent while the call is commencing. Fraud detection unit 220 may change a classification (e.g., non-fraudulent to fraudulent, or vice versa) of an incoming call as the probability calculated by probability calculation unit 224 changes throughout a duration of the incoming call. Additionally, fraud detection unit 220 may output a notification indicating the change in classification of the incoming call.

Figure 3:
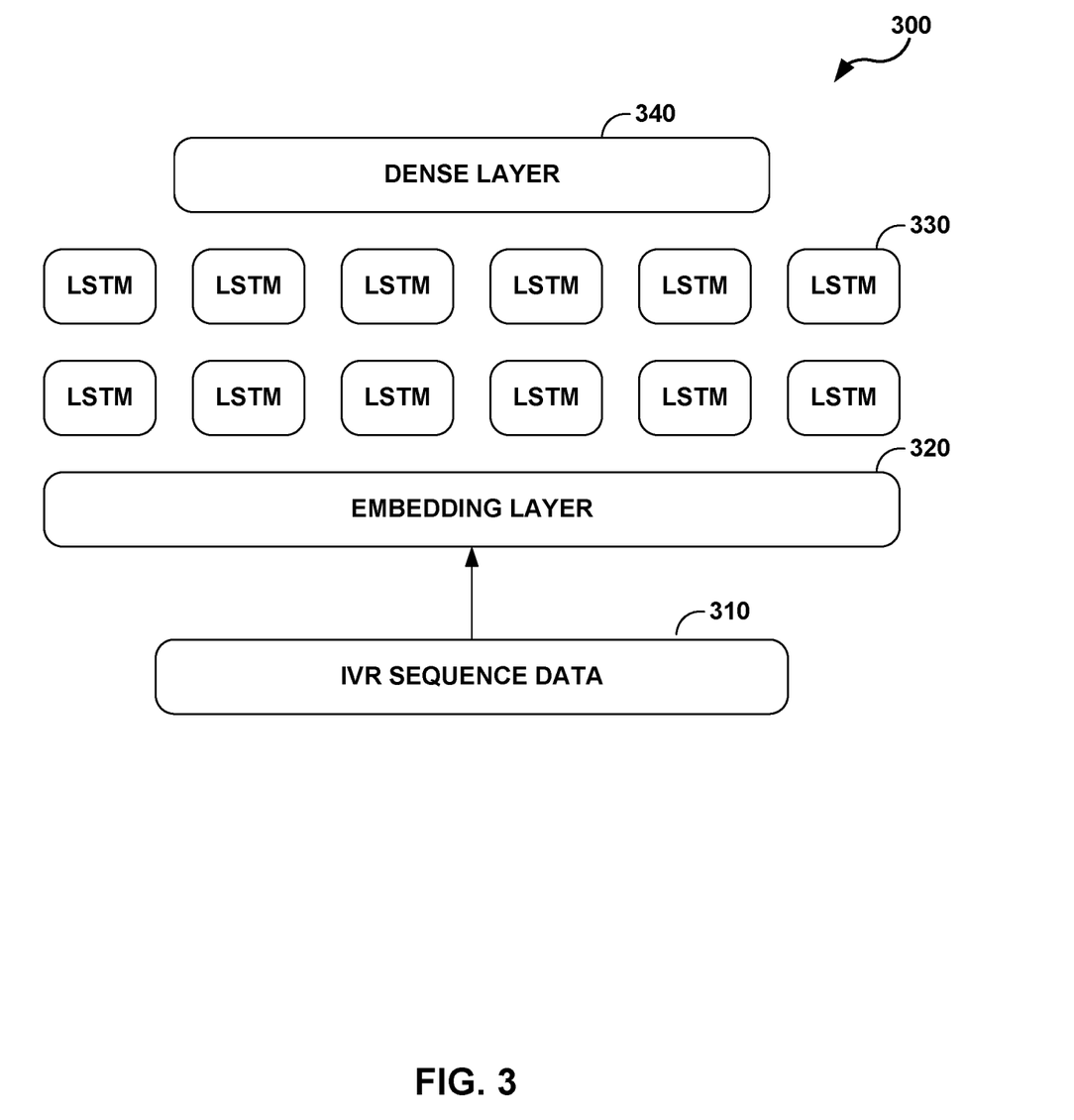
FIG. 3 is a block diagram illustrating an example deep learning model in accordance with the techniques of this disclosure.

FIG. 3 is a block diagram illustrating an example deep learning model 300 in accordance with the techniques of this disclosure. Deep learning model 300 may be an example implementation of deep learning model 210 of internal fraud detection system 200 of FIG. 2, or a deep learning model executed on internal fraud detection system 21 within contact center 12 of FIG. 1. As illustrated in FIG. 3, deep learning model 300 includes IVR sequence data 310, embedding layer 320, a plurality of long short-term memory (LSTM) units 330, and dense layer 340.

Deep learning model 300 may include a neural network, such as a recurrent neural network (RNN). In some examples, RNNs may anticipate future elements of a sequence in a process known as sequence prediction. An RNN employing sequence prediction may seek to forecast a future value of a sequence. In other examples, RNNs may be implemented in sequence classification problems. Sequence classification, unlike sequence prediction, seeks to assign a classification to a particular sequence rather than predict future elements of the sequence. In accordance with the techniques described in this disclosure, deep learning model 300 is implemented to classify a sequence of code pairs representing a call into contact center 12 as either fraudulent or non-fraudulent. The model may be trained using a set of training data, and the model may provide a multivariate framework in which a sequence of code pairs may be analyzed.

IVR sequence data 310 may be training data, e.g., training data 209 of FIG. 2, or incoming call data. In the example of IVR sequence data 310 being training data, IVR sequence data may include data representative of a plurality of calls into one or more IVR systems, e.g., IVR systems 22 of contact center 12 or other IVR systems, over a period of time, e.g., months or years. Each call of the plurality of calls defining the training data may be recognized as either fraudulent or non-fraudulent. In other words, the training data includes markers classifying the status of each call. IVR sequence data 310 may include a set of actions performed by one of user devices 16, and a set of results performed by IVR systems 22. Embedding layer 320 may identify the set of actions and the set of results. Embedding layer 320 may generate a dictionary (e.g., dictionary 207) by creating an entry in the dictionary to map each unique action of the set of actions to an action code. Additionally, embedding layer 320 may create an entry in the dictionary to map each unique result of the set of results to a result code. After creating the dictionary, embedding layer 320 may create a sequence of code pairs for each call of the plurality of calls using the dictionary. The sequences of code pairs may be used to train deep learning model 300.

In the example of IVR sequence data 310 being incoming call data to an IVR system within a contact center, e.g., one of IVR systems 22 of contact center 12, IVR sequence data 310 may include data indicative of an incoming call between one of user devices 16 and IVR systems 22. The incoming call may be ongoing, and IVR sequence data 310 may be updated in real-time as actions and results occur during the incoming call. Embedding layer 320 may identify a sequence of code pairs representing IVR sequence data 310 using dictionary 207, where dictionary 207 is created during the training of deep learning model 300. Embedding layer 320 may update the sequence of code pairs as the incoming call occurs. Deep learning model 300 may use the sequence of code pairs to classify the incoming call as either fraudulent or non-fraudulent.

LSTM units 330 may use the input data set created by embedding layer 320 to create an output data set included in dense layer 340. Each LSTM unit 330 may include a cell, an input gate, an output gate, and a forget gate. The cell of the LSTM unit 330 is configured to store a value for a period of time. The input gate is configured to either allow or disallow a value from entering the LSTM unit 330. After a value enters the input gate, the LSTM unit 330 may "remember" the value by storing the value in the cell. By remembering past values of a sequence, LSTM units 330 may enable deep learning model 300 to identify patterns in a sequence. The forget gate controls the amount of time that the value remains in the LSTM unit 330 (e.g., the LSTM unit 330 "forgets" the value if the forget gate is opened and the value leaves the cell). The output gate determines when the value stored in the cell of the LSTM unit 330 is applied to the RNN as a whole. "Outputting" the value does not cause LSTM unit 330 to "forget" the value. In fact, the output gate may be configured to allow LSTM unit 330 to apply the value to the RNN indefinitely while preserving the value in the cell. Various LSTM units 330 may be connected, and each connection between one or more LSTM unit 330 may define a "weight" value that is determined during training of the deep learning model 300. Thus, in this example, LSTM units 330 and their respective weights may perform the functions of pattern analysis unit 214 of FIG. 2.

RNNs may be susceptible to the vanishing gradient problem, a persistent issue in training neural networks which may cause backpropagated errors to corrupt the neural network as a whole. In one example, LSTM units 330 may be used to solve the vanishing gradient problem by eliminating (e.g., "forgetting") backpropagated errors.

After deep learning model 300 is trained, LSTM units 330 may be used to classify an input data set representing an incoming call as either fraudulent or non-fraudulent. The input data set may be included in embedding layer 320, and LSTM units 330 may determine the classification of the incoming call represented by dense layer 340. Values stored in LSTM units 330 and weights connecting LSTM units 330 may be coefficients of a function (e.g., a machine learning algorithm) which uses the input data set to determine an output data set indicating the classification of the incoming call.

Dense layer 340 may include results of deep learning model 300 based on IVR sequence data 310. For example, dense layer 340 may include characterizations (e.g., fraudulent or non-fraudulent) of each incoming call to contact center 12 that is applied to deep learning model 300. Dense layer 340 may include classifications of each sequence of code pairs representing a single call into contact center 12. In some examples, deep learning model 300 is trained using a set of input data representing a plurality of calls known to be fraudulent. During training, LSTM units 330 may identify patterns associated with the plurality of calls known to be fraudulent. Subsequently, deep learning model 300 may be subjected to a verification process where a data set including calls known to be fraudulent and calls known to be non-fraudulent is applied to deep learning model 300. An accuracy of deep learning model 300 may be calculated based on the ratio in which deep learning model 300 correctly classifies the calls in the data set.

Figure 4:
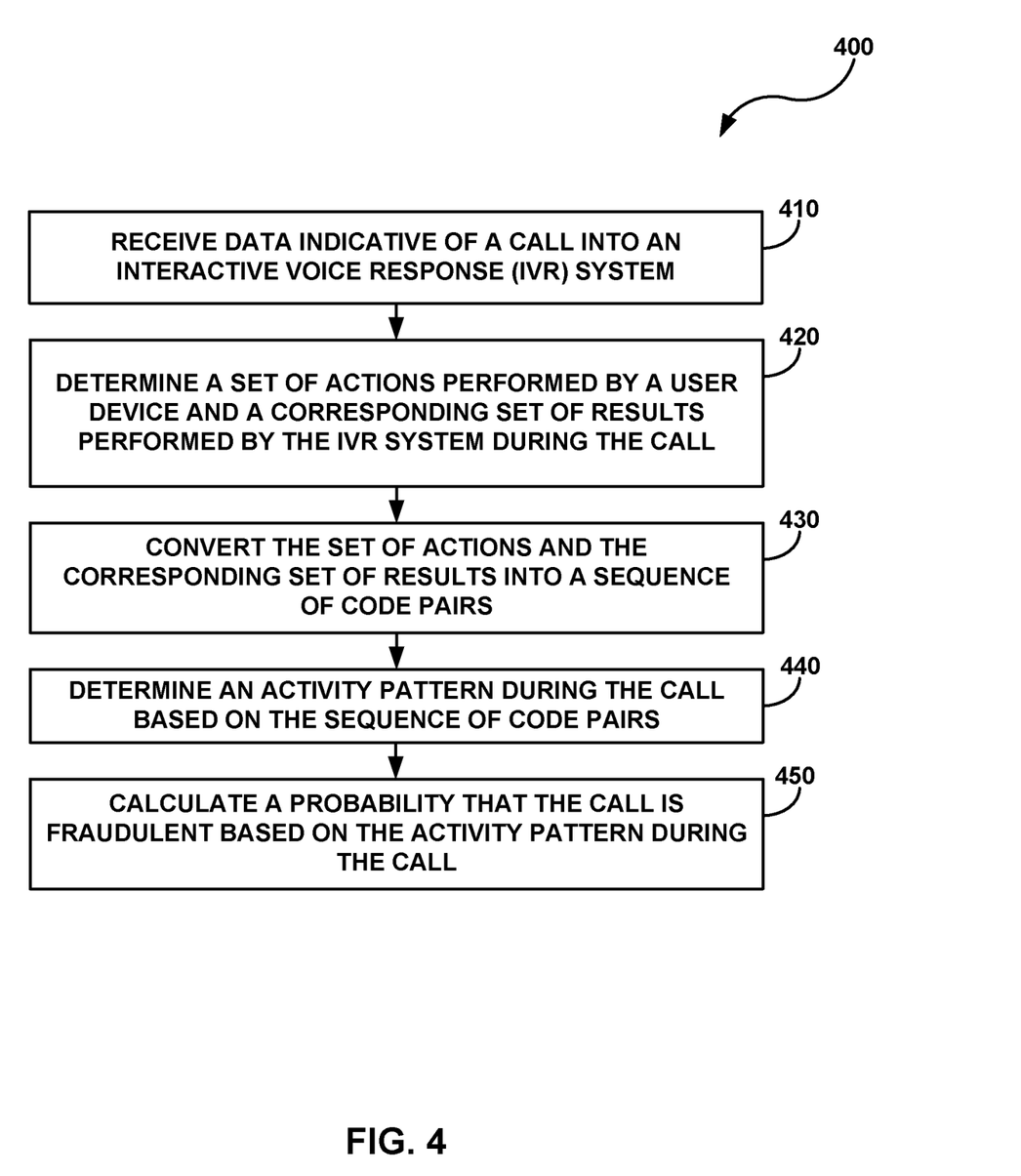
FIG. 4 is a flow diagram illustrating an example operation of a fraud detection system, in accordance with techniques of this disclosure.

FIG. 4 is a flow diagram illustrating an example operation 400 of a fraud detection system, in accordance with techniques of this disclosure. Example operation 400 is described with respect to internal fraud detection system 200 of FIG. 2. In other examples, operation 400 may be performed by internal fraud detection system 21 within contact center 12 of FIG. 1.

According to example operation 400, fraud detection unit 220 of internal fraud detection system 200 receives data indicative of an incoming call into a system of contact center 12, such as IVR systems 22 (410). As an example, the incoming call may represent a call between a user device 16 and one of IVR systems 22 of contact center 12 from FIG. 1. Fraud detection unit 220 then feeds the incoming call data to deep learning model 210 for fraud analysis.

Normalization unit 212 of deep learning model 210 determines a set of actions performed by the user device 16 and a corresponding set of results performed by the system of contact center 12 (e.g., IVR systems 22) during the incoming call (420).

Normalization unit 212 of deep learning model 210 then converts the set of actions and the corresponding set of results into a sequence of code pairs using a dictionary (e.g., dictionary 207) established based on training data (e.g., training data 209) (430). In some examples, normalization unit 212 identifies, from the data indicative of the call, a plurality of primary species of words entered by the user device. Each primary species of words may represent an action from the set of actions performed by the user device 16 during the call. Normalization unit 212 may assign, using dictionary 207, an action code to represent each action from the set of actions performed by the user device. Internal fraud detection system 200 may also identify, from the data indicative of the call, a plurality of secondary species of words entered by IVR systems 22. Each secondary species of words may represent a result from the set of results performed by IVR systems 22 during the call in response to a corresponding action from the set of actions performed by the user device 16 during the call. Furthermore, internal fraud detection system 200 may assign, using dictionary 207, a result code to represent one or more of the results from the set of results performed by IVR systems 22. In other words, dictionary 207 maps the set of actions and the corresponding set of results to the sequence of code pairs.

Pattern analysis unit 214 determines an activity pattern during the incoming call based on the sequence of code pairs (440). The determined activity pattern, like dictionary 207, may be derived from training data 209. For example, training unit 230 may train deep learning model 210 using training data 209 to identify patterns 208 associated with fraudulent calls. In some examples, the patterns 208 produced by training unit 230 may include a plurality of patterns associated with fraudulent behavior. In some examples, determining the activity pattern may include identifying, based on the sequence of code pairs, one or more patterns that indicate fraudulent intent.

Once the activity pattern during the call is determined by pattern analysis unit 214 of deep learning model 210, probability calculation unit 224 of fraud detection unit 220 calculates a probability that the call is fraudulent based the determined activity pattern during the incoming call (450). Known patterns (e.g., patterns 208 of internal fraud detection system 200) produced by training unit 230 based on training data 209 may affect the calculation of the probability. For example, calculating the probability that the call is fraudulent may include determining a level of similarity between the sequence of code pairs and the identified patterns included in the activity pattern determined by internal fraud detection system 200.

Figure 5:
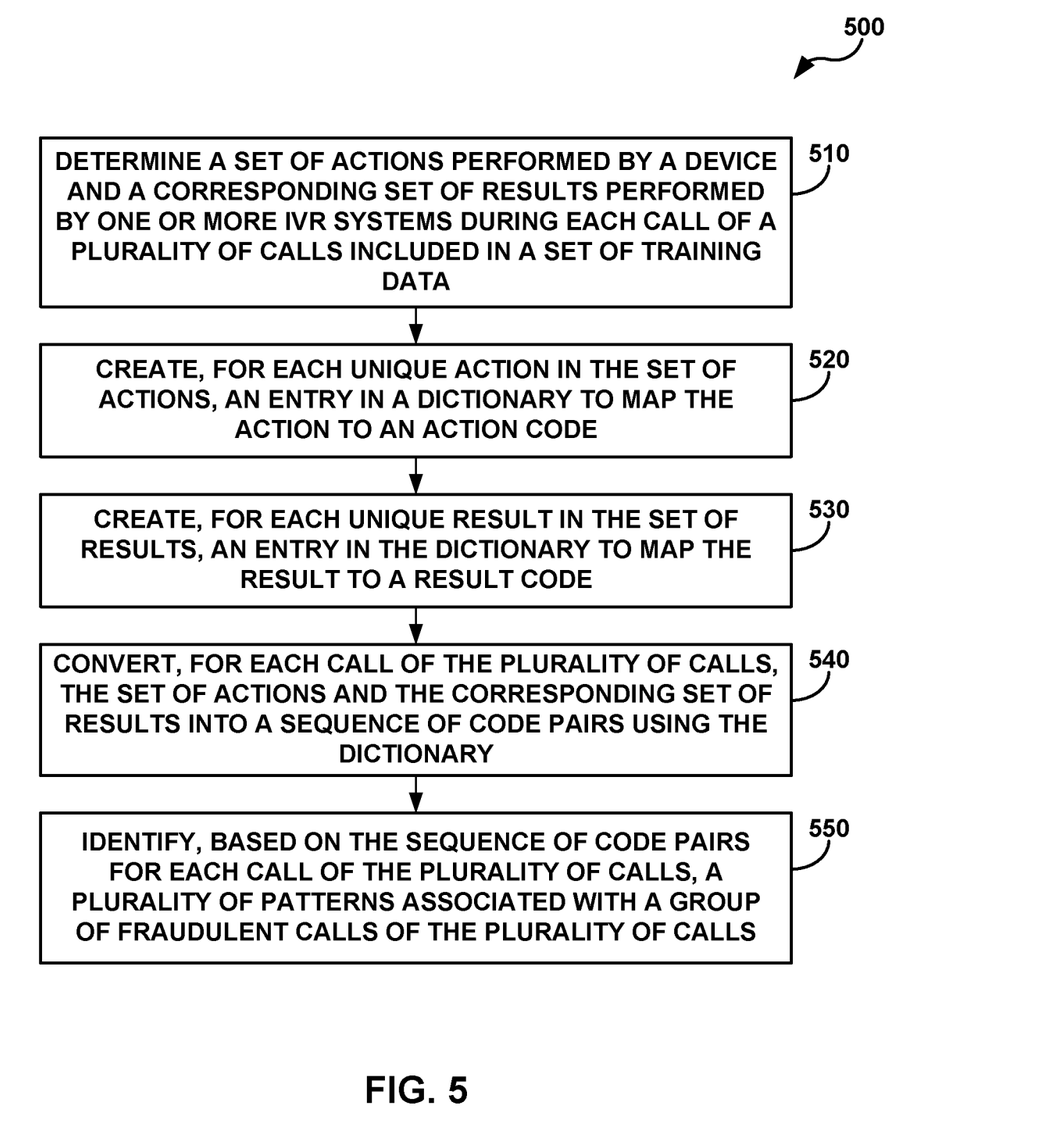
FIG. 5 is a flow diagram illustrating an example operation of training a deep learning model executed by a fraud detection system, in accordance with techniques of this disclosure.

FIG. 5 is a flowchart illustrating example operation 500 of training a deep learning model executed by a fraud detection system, such as internal fraud detection system 200 of FIG. 2, in accordance with techniques of this disclosure. Example operation 400 is described with respect to internal fraud detection system 200 of FIG. 2. In other examples, operation 400 may be performed by internal fraud detection system 21 within contact center 12 of FIG. 1.

According to example operation 500, training unit 230 determines a set of actions performed by a user device 16 and a corresponding set of results performed by one or more IVR systems 22 during each call of a plurality of calls in training data 209 (510). As an example, each incoming call may represent a call between a user device 16 and IVR systems 22 of contact center 12 from FIG. 1. In some examples, each call of the plurality of calls of training data 209 may either be known to represent a fraudulent call or be known to represent a non-fraudulent call. In some examples, training data 209 includes data indicative of over two million calls to the one or more IVR systems. Alternatively, training data 209 may include data indicative of less than about two million or more than about two million calls to the one or more IVR systems.

Mapping unit 232 of training unit 230 creates, for each unique action in the set of actions, an entry in dictionary 207 to may the action to an action code (520). Additionally, mapping unit 232 creates, for each unique result in the set of results, an entry in dictionary 207 to map the result to a result code (530). The entries of dictionary 207 may include words of the English language or other languages, single numerals, groups of single numerals, numerical strings, groups of numerical strings, single characters, groups of single characters, character strings, groups of character strings, or the like. For example, a single entry of dictionary 207 may be assigned to a group of numerical strings each representing specific amounts of currency. Mapping unit 232 may create dictionary 207 to include greater than about 30,000 words and less than about 40,000 words. Alternatively, mapping unit 232 may create dictionary 207 to include less than about 30,000 words or greater than about 40,000 words. In some examples, training unit 230 may output entries of dictionary 207 to storage units 206.

Once dictionary 207 is created, normalization unit 212 of deep learning model 210 converts, for each call of the plurality of calls in training data 209, the set of actions and the corresponding set of results into a sequence of code pairs using dictionary 207 (540). In some examples, normalization unit 212 generates a code pair including an action code and a corresponding result code. Normalization unit 212 may generate a code pair for each action from the set of actions performed by the user device 16 and the corresponding result from the set of results performed by IVR systems 22 during each call of the plurality of calls included in training data 209. The sequence of code pairs may include all code pairs generated by normalization unit 212 for each call of the plurality of calls.

Pattern analysis unit 214 of deep learning model 210 identifies, based on the sequence of code pairs for each call of the plurality of calls, a plurality of patterns associated with the group of fraudulent calls of the plurality of calls (550). Patterns 208 may include the plurality of patterns associated with the group of fraudulent patterns.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:
1. A computing system comprising:
a memory; and
one or more processors in communication with the memory and configured to:
determine, in each call of a plurality of calls included in a set of training data, a set of actions performed by a device and a corresponding set of results performed by one or more interactive voice response (IVR) systems during a respective call of the plurality of calls, wherein the plurality of calls included in the set of training data includes a group of fraudulent calls and a group of non-fraudulent calls;

convert, for each call of the plurality of calls, the set of actions and the corresponding set of results into a sequence of code pairs using a dictionary;

identify, based on the sequence of code pairs for each call of the plurality of calls, a plurality of patterns associated with the group of fraudulent calls included in the set of training data;

determine an activity pattern during an incoming call into an IVR system; and calculate, based on the plurality of patterns associated with the group of fraudulent calls included in the set of training data and based on the activity pattern during the incoming call, a probability that the incoming call is fraudulent.

2. The computing system of claim 1, wherein the one or more processors are further configured to generate the dictionary based on the set of training data.

3. The computing device of claim 2, wherein to generate the dictionary, the one or more processors are further configured to:

create, for each unique action in each set of actions corresponding to each call of the plurality of calls included in the set of training data, an entry in the dictionary to map the action to an action code; and create, for each unique result in each set of results corresponding to each call of the plurality of calls included in the set of training data, an entry in the dictionary to map the result to a result code.

4. The computing system of claim 1, wherein the computing system comprises a deep learning model including the plurality of patterns associated with the group of fraudulent calls included in the set of training data, and wherein by identifying the plurality of patterns associated with the group of fraudulent calls included in the set of training data, the one or more processors are configured to train the deep learning model.

5. The computing system of claim 4, wherein the one or more processors are further configured to retrain the deep learning model based on an updated set of training data including an updated group of fraudulent calls and an updated group of non-fraudulent calls.

6. The computing system of claim 1, wherein the one or more processors are further configured to:

receive data indicative of the incoming call into the IVR system from a user device;

determine, based on the data indicative of the incoming call, a set of actions performed by the user device within the IVR system and a corresponding set of results performed by the IVR system during the incoming call;

convert the set of actions performed during the incoming call and the corresponding set of results performed by the incoming call into a sequence of code pairs using the dictionary, wherein each code pair of the sequence of code pairs includes an action code corresponding to an action of the set of actions performed during the incoming call and a result code corresponding to a respective result of the set of results performed during the incoming call; and determine the activity pattern during the incoming call based on the sequence of code pairs.

7. The computing system of claim 1, wherein to convert, for each call of the plurality of calls, the set of actions and the corresponding set of results into the sequence of code pairs, the one or more processors are configured to:

identify, for each call of the plurality of calls included in the training data, a species of words, wherein each word of the species of words represents unique account information; and assign a result code to represent the species of words, wherein the result code comprises a generalized account result code that is present in the dictionary and is not unique to the account information.

8. The computing system of claim 1 wherein to convert, for each call of the plurality of calls, the set of actions and the corresponding set of results into the sequence of code pairs, the one or more processors are configured to:

identify, for each call of the plurality of calls included in the training data, a species of words, wherein each word of the species of words represents a unique amount of currency associated with an action being performed by a user device; and assign a result code to represent the species of words, wherein the result code comprises a generalized balance result code that is present in the dictionary and is not unique to the amount of currency associated with the action being performed.

9. The computing device of claim 1, wherein to determine the activity pattern, the one or more processors are configured to identify, based on the sequence of code pairs, one or more known patterns associated with fraudulent calls, and wherein to calculate the probability that the call is fraudulent, the one or more processors are configured to determine a level of similarity between the sequence of code pairs and the known patterns.

10. The computing system of claim 1, wherein the one or more processors are further configured to:

determine that the incoming call is fraudulent if the probability is above a threshold value; and alert a fraud management system that the incoming call is fraudulent in response to determining that the incoming call is fraudulent.

11. A method comprising:

determining, by one or more processors in each call of a plurality of calls included in a set of training data, a set of actions performed by a device and a corresponding set of results performed by one or more interactive voice response (IVR) systems during a respective call of the plurality of calls, wherein the plurality of calls included in the set of training data includes a group of fraudulent calls and a group of non-fraudulent calls;

converting, by the one or more processors for each call of the plurality of calls, the set of actions and the corresponding set of results into a sequence of code pairs using a dictionary;

identifying, by the one or more processors based on the sequence of code pairs for each call of the plurality of calls, a plurality of patterns associated with the group of fraudulent calls included in the set of training data;

determining, by the one or more processors, an activity pattern during an incoming call into an IVR system; and calculating, by the one or more processors based on the plurality of patterns associated with the group of fraudulent calls included in the set of training data and based on the activity pattern during the incoming call, a probability that the incoming call is fraudulent.

12. The method of claim 11, wherein the method further comprises generating, by the one or more processors, the dictionary based on the set of data.

13. The method of claim 12, wherein generating the dictionary comprises:
   creating, by the one or more processors for each unique action in each set of actions corresponding to each call of the plurality of calls included in the set of training data, an entry in the dictionary to map the action to an action code; and
   creating, by the one or more processors for each unique result in each set of results corresponding to each call of the plurality of calls included in the set of training data, an entry in the dictionary to map the result to a result code.

14. The method of claim 11, wherein a deep learning model includes the plurality of patterns associated with the group of fraudulent calls included in the set of training data, and wherein identifying the plurality of patterns associated with the group of fraudulent calls included in the set of training data comprises training, by the one or more processors, the deep learning model.

15. The method of claim 14, further comprising retraining the deep learning model based on an updated set of training data including an updated group of fraudulent calls and an updated group of non-fraudulent calls.

16. The method of claim 11, further comprising:
   receiving, by the one or more processors, data indicative of the incoming call into the IVR system from a user device;
   determining, by the one or more processors based on the data indicative of the incoming call, a set of actions performed by the user device within the IVR system and a corresponding set of results performed by the IVR system during the incoming call; and
   converting, by the one or more processors, the set of actions performed during the incoming call and the corresponding set of results performed by the incoming call into a sequence of code pairs using the dictionary, wherein each code pair of the sequence of code pairs includes an action code corresponding to an action of the set of actions performed during the incoming call and a result code corresponding to a respective result of the set of results performed during the incoming call,
   wherein determining the activity pattern during the incoming call further comprises determining the activity pattern during the incoming call based on the sequence of code pairs.

17. The method of claim 11, wherein converting, for each call of the plurality of calls, the set of actions and the corresponding set of results into the sequence of code pairs comprises:
   identifying, for each call of the plurality of calls included in the training data, a species of words, wherein each word of the species of words represents unique account information; and
   assigning a result code to represent the species of words, wherein the result code comprises a generalized account result code that is present in the dictionary and is not unique to the account information.

18. The method of claim 11,
   wherein determining the activity pattern comprises identifying, based on the sequence of code pairs, one or more known patterns associated with fraudulent calls, and
   wherein calculating the probability that the call is fraudulent comprises determining a level of similarity between the sequence of code pairs and the known patterns.

19. The method of claim 11, further comprising:
   determining that the incoming call is fraudulent if the probability is above a threshold value; and
   alerting a fraud management system that the incoming call is fraudulent in response to determining that the incoming call is fraudulent.

20. A non-transitory computer readable medium comprising instructions that when executed cause one or more processors to:
   determine, in each call of a plurality of calls included in a set of training data, a set of actions performed by a device and a corresponding set of results performed by one or more interactive voice response (IVR) systems during a respective call of the plurality of calls, wherein the plurality of calls included in the set of training data includes a group of fraudulent calls and a group of non-fraudulent calls;
   convert, for each call of the plurality of calls, the set of actions and the corresponding set of results into a sequence of code pairs using a dictionary;
   identify, based on the sequence of code pairs for each call of the plurality of calls, a plurality of patterns associated with the group of fraudulent calls included in the set of training data;
   determine an activity pattern during an incoming call into an IVR system; and
   calculate, based on the plurality of patterns associated with the group of fraudulent calls included in the set of training data and based on the activity pattern during the incoming call, a probability that the incoming call is fraudulent.

* * * * *